L. C. WALKER.

FASTENER FOR THE MEETING RAILS OF SASHES.

No. 11,287. Reissued Nov. 22, 1892.

WITNESSES:

F. W. Warner,

J. A. Walsh

INVENTOR

Lewis C. Walker, per

C. T. Ellis & Bradford,

ATTORNEYS

UNITED STATES PATENT OFFICE.

LEWIS C. WALKER, OF INDIANAPOLIS, INDIANA.

FASTENER FOR THE MEETING-RAILS OF SASHES.

SPECIFICATION forming part of Reissued Letters Patent No. 11,287, dated November 22, 1892.

Original No. 472,088, dated April 5, 1892. Application for reissue filed June 29, 1892. Serial No. 438,463.

*To all whom it may concern:*

Be it known that I, LEWIS C. WALKER, a citizen of the United States, residing at Indianapolis, in the county of Marion and State of Indiana, have invented certain new and useful Improvements in Fasteners for the Meeting-Rails of Sashes, of which the following is a specification.

The object of my said invention is to produce an improved form of a lock or fastener by which the upper and lower sashes of windows can be secured together at any point, thus holding them in fixed relation to each other, while ventilation is provided either at the top or at the bottom, or at both places, as may be desired.

A lock or fastener embodying my said invention will first be fully described, and the novel features thereof then pointed out in the claims.

Figure 1:
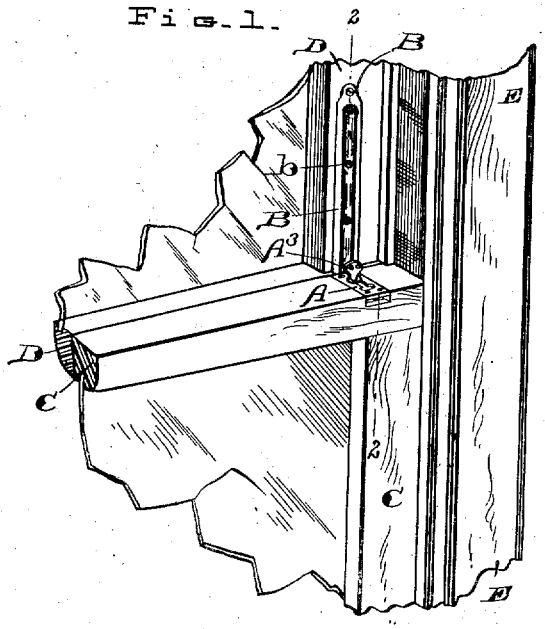
Figure 2:
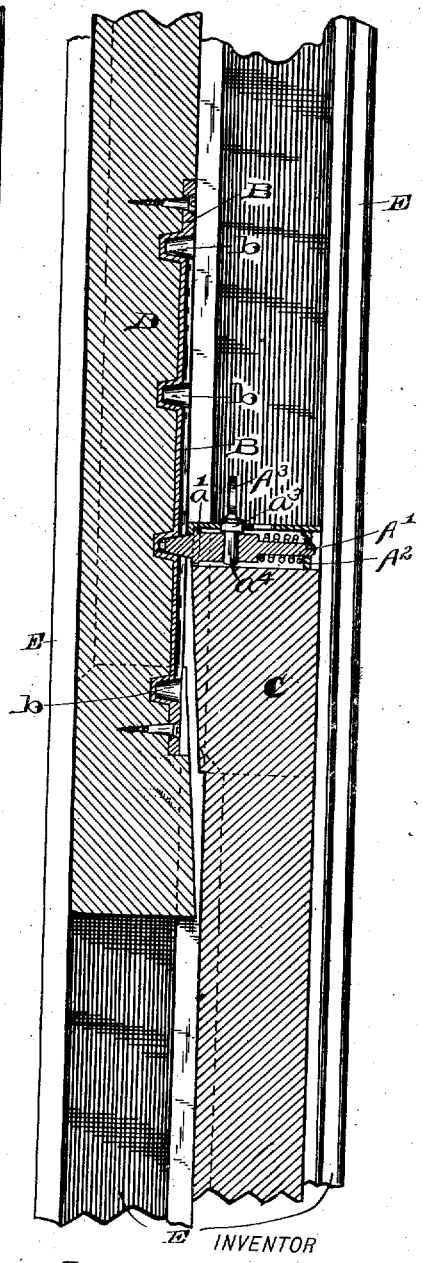
Figure 3:
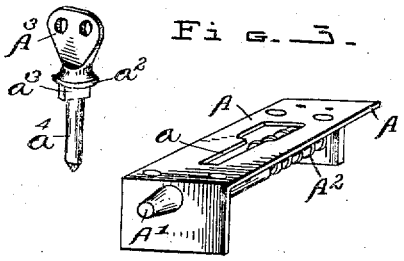
Figure 4:
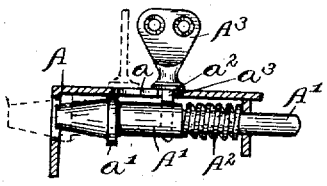

Referring to the accompanying drawings, which are made a part hereof, and on which similar letters of reference indicate similar parts, Figure 1 is a fragmentary perspective view showing the adjacent corners of the upper and lower sashes and a fragment of the frame in which they are mounted, said sashes having one of my improved locks or fasteners attached thereto; Fig. 2, a detail sectional view of the same; Fig. 3, a perspective view of the lock and its key separately, and Fig. 4 a detail sectional view of said lock.

In said drawings the portions marked A represent the lock; B, the catch-plate with which the bolt of the lock engages; C, the lower sash; D, the upper sash, and E the window-frame.

The lock consists of the casing A, which has a slot $a$ in its upper side with an enlarged portion, (for purposes which will be presently explained,) and a spring-mounted bolt A′, moving longitudinally thereof. The point of the bolt (which is preferably tapered) is adapted to project through a hole in the front end of its casing A and engage with holes or sockets in the catch-plate B. A collar or shoulder $a'$ limits its movement in this direction. Its rear portion is smaller, and a spring $A^2$ surrounds this smaller portion and extends between the shoulder thus formed and the rear end of the casing A, as shown most plainly in Fig. 4. The stud or key $A^3$ extends down through the slot $a$ and enters a hole in the bolt A′, and is thus adapted to operate said bolt. Said key is removable, and can be thus kept out of the way of children or mischievous persons. Just below the handle portion of this key and directly under a flange $a^2$, which forms the termination of said handle portion, is an enlarged and flattened portion or neck $a^3$. This neck $a^3$ is of the same diameter in one direction as is the point $a^4$, which extends down into the hole in the bolt A′; but in the other direction it is considerably larger. Said neck will therefore pass down into the narrow portion of the slot when turned, so that its longer diameter stands longitudinally thereof, and when the bolt is pulled back by means of said key said key can be turned transversely with its original position, and the longer diameter will then rest transversely of the slot in the enlarged portion of said slot, and, being longer than the narrower portion of the slot, will form a detent and hold the bolt from moving forward. When the parts are in this position, it is obvious that the sashes may be moved up and down past each other in the same manner as if my lock were not attached.

The catch-plate B is secured to the upper sash and has a series of holes or sockets $b$ for the point of the bolt. It preferably has a groove in its face, which when the bolt A′ is forward in contact therewith assists in holding the sashes in line with each other and in guiding the point of the bolt into the desired hole or socket. These holes or sockets may be made slightly tapering, if desired, as shown, and the point of the bolt given a corresponding taper, which also aids in the easy and prompt engagement of the parts and adds to the firmness of the union when they are engaged. My device when in use therefore not only locks the sashes securely together, but holds them firmly in their relative positions and to a great degree prevents them from shaking or rattling.

The sashes C and D and window-frame E are of course or may be of any ordinary or desired construction. As shown, they are of the common and well-known form.

While my device is of a simple and inexpensive construction, it is strong and durable. The key being removable, the sash may be left raised or lowered for ventilation over night or during the absence of the occupants, and the opening thus left will be too small to admit an intruder, while he cannot operate the lock, except by breaking the glass near to it, thus enabling him to reach the lock and operate it with a key or its equivalent. The peculiar form of the neck of the key and the slot in the casing of the lock enables the bolt to be held back, except when it is desired that the lock shall be in use, and such form is therefore of great advantage. Were it necessary to operate the lock every time it was desired to move the sash in ordinary use it would be troublesome and vexatious; but by this provision its use may be limited, as desired, and its compulsory manipulation is avoided.

Having thus fully described my said invention, what I claim as new, and desire to secure by Letters Patent, is—

1. The combination, with the upper and the lower sashes of a window, of a lock having a spring-mounted bolt, a key adapted to operate the same, a slot in the upper part of the casing of the lock, through which the key passes, having an enlargement at its rear end, said key also having an enlarged neck which is adapted to be turned when put into said enlarged portion of the slot and the bolt thus held back out of operative position, when desired, said lock being mounted on the lower sash, and a series of sockets for the bolt in the side rail of the upper sash, substantially as set forth.

2. A sash-fastener comprising a lock having a tapering bolt seated therein, a removable key, and an opening in the upper part of the lock to allow the insertion of the key, such opening having an enlargement at one end for the engagement of the enlarged neck portion of the key, whereby the bolt is retained within its casing, said lock being secured to the top of the meeting-rail of the lower sash, in combination with a catch-plate secured to the side rail of the upper sash and provided with a series of holes or sockets, substantially as shown and described.

3. The combination of the upper sash of a window, a plate having a longitudinal groove and a series of holes or sockets secured thereon, the lower sash having a lock composed of a casing, a spring-mounted bolt the spring whereof normally holds the bolt forward into engagement with one of said holes or sockets, and a key passing through the casing and entering a hole in said bolt, whereby the bolt may be withdrawn and the sashes left free to operate, substantially as set forth.

4. A sash-fastener comprising a casing having a bolt seated therein, a spring coiled around such bolt, forcing the same outward by its tension, a removable key having a flange, and an opening in the upper part of the casing to allow the insertion and operation of such key, such opening having an enlargement whereby when the key is turned and engages in such opening the bolt is retained within its casing, substantially as shown and described.

In witness whereof I have hereunto set my hand, at Indianapolis, Indiana, this 22d day of June, 1892.

LEWIS C. WALKER.

Witnesses:
CHESTER BRADFORD,
J. A. WALSH.